(12) United States Patent
Sun et al.

(10) Patent No.: US 8,749,911 B1
(45) Date of Patent: Jun. 10, 2014

(54) DISK DRIVE ACCOUNTING FOR FRACTIONAL CLOCK CYCLE WHEN MEASURING READER/WRITER GAP

(71) Applicant: Western Digital Technologies, Inc., Irvine, CA (US)

(72) Inventors: Zhenyu Sun, Irvine, CA (US); Teik Ee Yeo, Trabuco Canyon, CA (US); Qiming Bao, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/794,233

(22) Filed: Mar. 11, 2013

(51) Int. Cl.
 *G11B 21/02* (2006.01)
(52) U.S. Cl.
 USPC .......................................................... 360/75
(58) Field of Classification Search
 CPC ........... G11B 5/59616; G11B 5/59638; G11B 5/59655; G11B 5/5547; G11B 27/36; G11B 5/59633; G11B 5/59627
 USPC ........................... 360/75, 51, 31, 77.08, 78.14
 See application file for complete search history.

(56) References Cited

U.S. PATENT DOCUMENTS

| | | | |
|---|---|---|---|
| 6,724,553 B2 | 4/2004 | Yun et al. | |
| 6,754,030 B2 | 6/2004 | Seng et al. | |
| 7,006,316 B1 | 2/2006 | Sargenti, Jr. et al. | |
| 7,106,534 B2 | 9/2006 | Yoshida et al. | |
| 7,400,464 B1 | 7/2008 | Katchmart | |
| 7,518,819 B1 * | 4/2009 | Yu et al. | 360/75 |
| 7,602,568 B1 | 10/2009 | Katchmart | |
| 7,679,852 B2 | 3/2010 | Shaver et al. | |
| 7,773,328 B1 | 8/2010 | Katchmart et al. | |
| 2003/0002197 A1 | 1/2003 | Seng et al. | |

* cited by examiner

*Primary Examiner* — Nabil Hindi

(57) ABSTRACT

A disk drive is disclosed comprising a head actuated radially over a disk, wherein the head comprises a read element separated from a write element by a reader/writer gap. A disk-locked clock synchronized to a rotation of the disk comprises a plurality of clock cycles, and the reader/writer gap spans a first number of the clock cycles comprising a first integer of the clock cycles plus a fraction of one of the clock cycles. A reference clock cycle of the disk-locked clock is determined, and a write operation is delayed relative to the reference clock cycle by a write delay comprising a second number of clock cycles comprising a second integer of the clock cycles plus the fraction of one of the clock cycles. A sync mark is written on the disk after the write delay, and the sync mark is read to estimate the first number of clock cycles.

12 Claims, 4 Drawing Sheets

DISK DRIVE ACCOUNTING FOR FRACTIONAL CLOCK CYCLE WHEN MEASURING READER/WRITER GAP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format comprising a number of servo sectors $6_0$-$6_N$ recorded around the circumference of the disk 2 that define a plurality of servo tracks 4, wherein data tracks are defined relative to the servo tracks (at the same or different radial density). Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

DETAILED DESCRIPTION

Figure 2A:
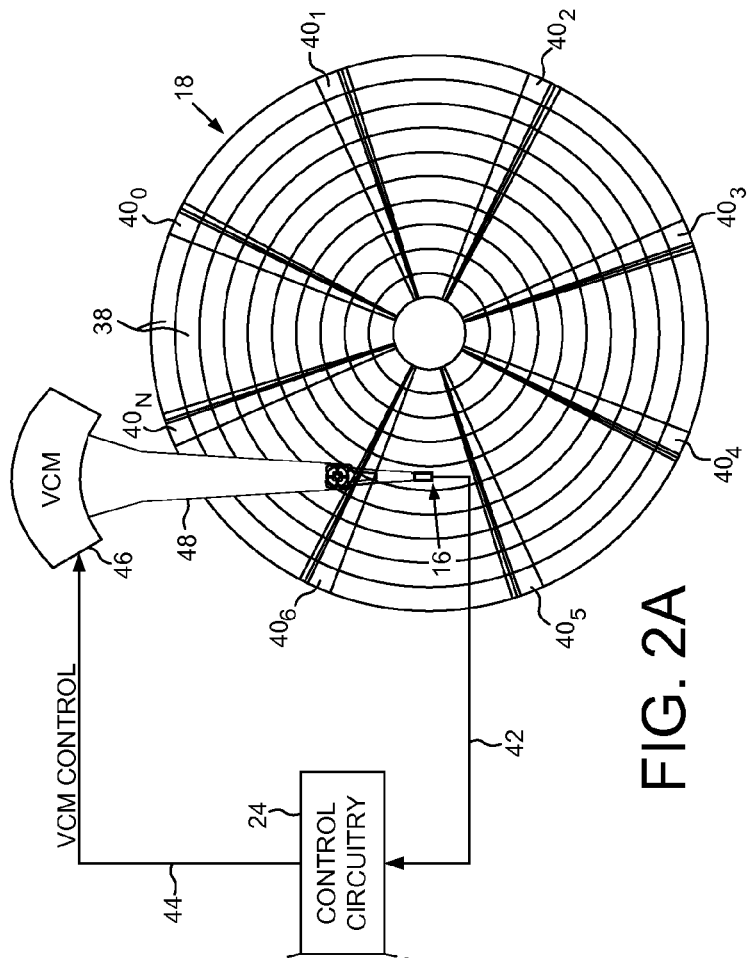
FIG. 2A shows a disk drive according to an embodiment comprising a head actuated radially over a disk in response to the servo sectors.
Figure 2B:
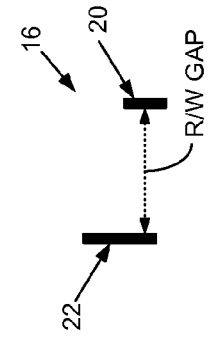
FIG. 2B shows an embodiment wherein the head comprises a read element separated from a write element by a reader/writer gap.
Figure 2C:
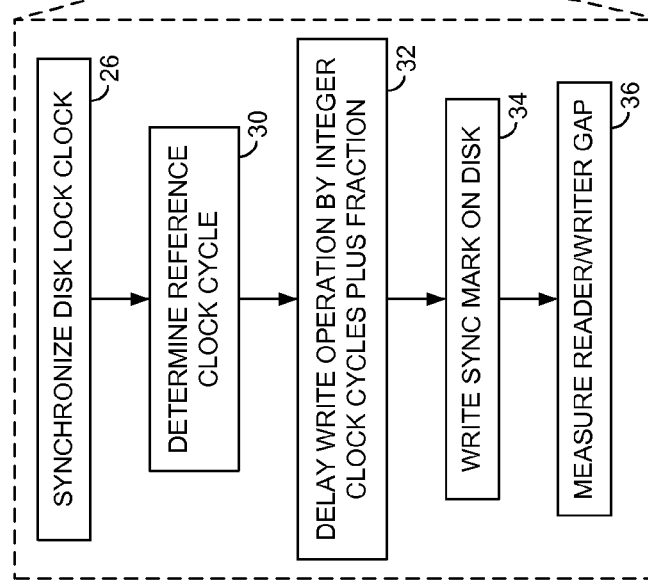
FIG. 2C is a flow diagram according to an embodiment for measuring the reader/writer gap in terms of an integer number plus a fraction of clock cycles of a disk-locked clock.
Figure 2D:
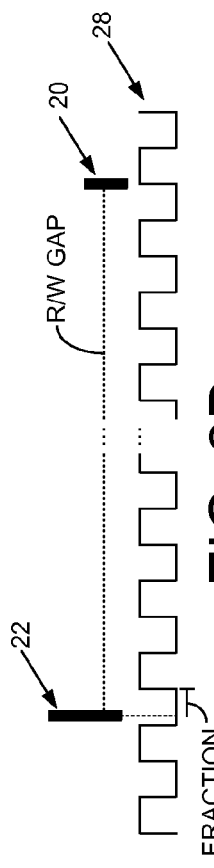
FIG. 2D shows an embodiment wherein a sync mark is written after a write delay comprising an integer number of clock cycles plus the fraction.

FIG. 2A shows a disk drive according to an embodiment comprising a head 16 actuated over a disk 18, wherein the head 16 (FIG. 2B) comprises a read element 20 separated from a write element 22 by a reader/writer gap. The disk drive further comprises control circuitry 24 operable to execute the flow diagram of FIG. 2C, wherein a disk-locked clock is synchronized to a rotation of the disk (block 26). The disk-locked clock comprises a plurality of clock cycles 28, and the reader/writer gap spans a first number of the clock cycles comprising a first integer of the clock cycles plus a fraction of one of the clock cycles (FIG. 2D). A reference clock cycle of the disk-locked clock is determined (block 30), and a write operation is delayed relative to the reference clock cycle by a write delay comprising a second number of clock cycles comprising a second integer of the clock cycles plus the fraction of one of the clock cycles (block 32). A sync mark is written on the disk after the write delay (block 34), and the sync mark is read to estimate the first number of clock cycles (block 36).

Figure 1:
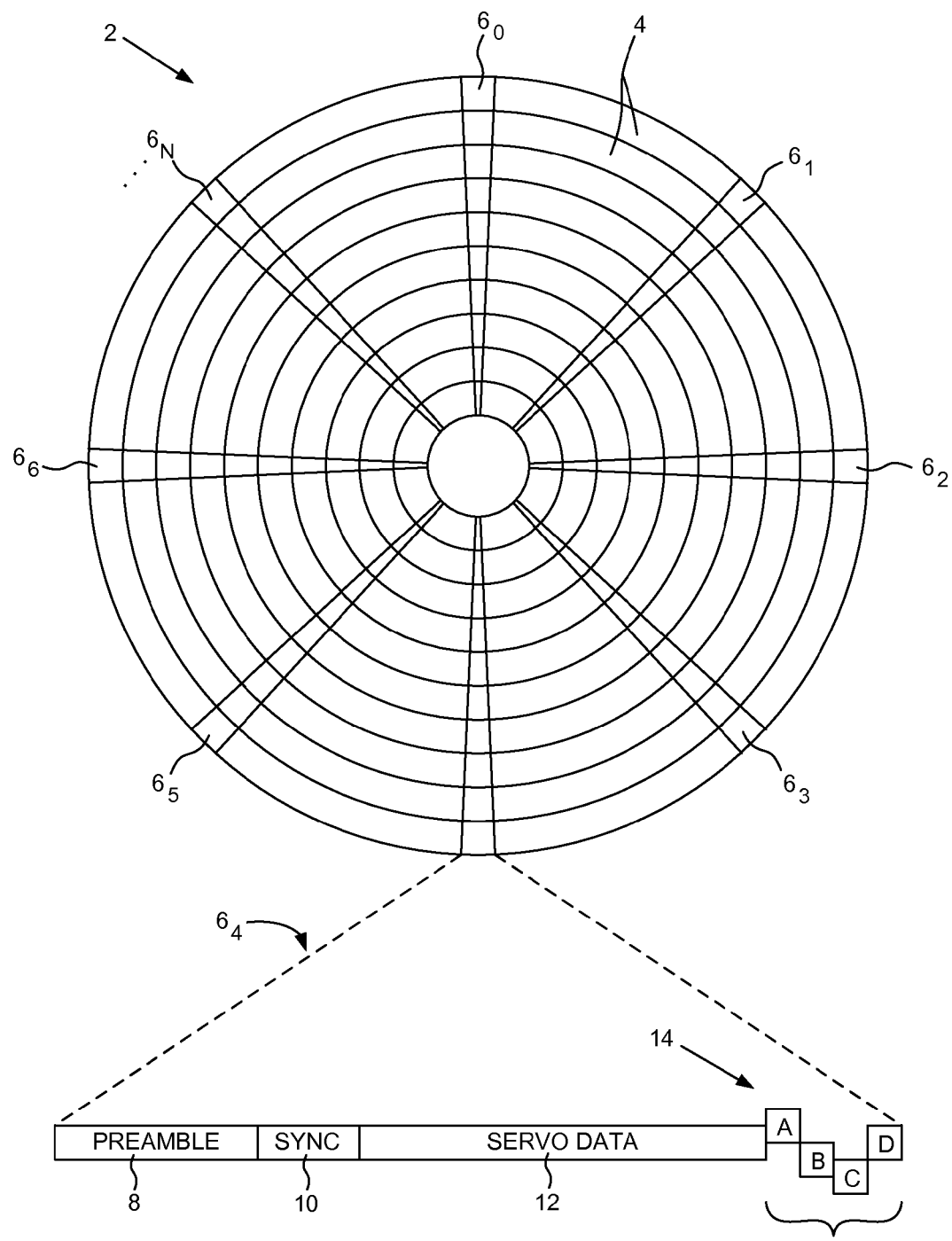
FIG. 1 shows a prior art disk format comprising a plurality of servo tracks defined by servo sectors.

In the embodiment of FIG. 2A, a plurality of concentric servo tracks 38 are defined by embedded servo sectors $40_0$-$40_N$, wherein a plurality of concentric data tracks are defined relative to the servo tracks. The control circuitry 24 processes a read signal 42 emanating from the head 16 to demodulate the servo sectors and generate a position error signal (PES) representing an error between the actual position of the head and a target position relative to a target track. The control circuitry 24 filters the PES using a suitable compensation filter to generate a control signal 44 applied to a voice coil motor (VCM) 46 which rotates an actuator arm 48 about a pivot in order to actuate the head 16 radially over the disk 18 in a direction that reduces the PES. The servo sectors $40_0$-$40_N$ may comprise any suitable head position information, such as a track address for coarse positioning and servo bursts for fine positioning. The servo bursts may comprise any suitable pattern, such as an amplitude based servo pattern (FIG. 1) or a phase based servo pattern.

In an embodiment described below, extended servo data may be learned (e.g., compensation values that account for a repeatable disturbance) which may then be written after each servo sector as illustrated in the embodiment of FIG. 2A. During normal operation, the control circuitry 24 may read and process the extended servo data to facilitate servoing the head radially over the disk. In one embodiment, it may be desirable to write the extended servo data synchronous with each servo sector in order to obviate a preamble and sync mark in front of the extended servo data, thereby improving the format efficiency. In order to write the extended servo data synchronous with each servo sector, in one embodiment the reader/writer gap in terms of clock cycles of the disk-locked clock is measured and then used to write the extended servo data synchronous with each servo sector.

Figure 3A:
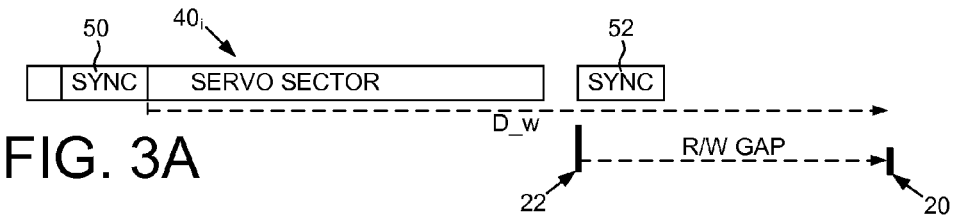
FIG. 3A shows an embodiment wherein the write delay is generated relative to a sync mark in a servo sector.
Figure 3B:
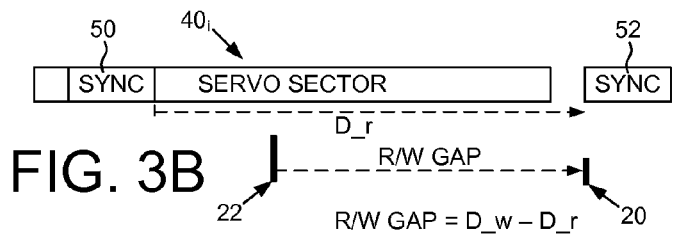
FIG. 3B shows an embodiment wherein a read delay is measured from the sync mark in the servo sector to the sync mark written after the write delay.

FIGS. 3A and 3B illustrate a technique for measuring the reader/writer gap when the reader/writer gap spans an integer number of the clock cycles 28. A reference clock cycle of the disk locked clock is determined, such as when the read element 20 reaches the end of a first sync mark 50 in a servo sector $40_i$. After delaying by a write delay (D_w) comprising an integer number of clock cycles as measured from the reference clock cycle, a second sync mark 52 is written during a first revolution of the disk. During a second revolution of the disk, a read delay (D_r) is measured from the reference clock cycle to the beginning of the second sync mark 52 (as determined after detecting the second sync mark 52). The reader/writer gap is then computed by subtracting the read delay (D_r) from the write delay (D_w).

Figure 4A:
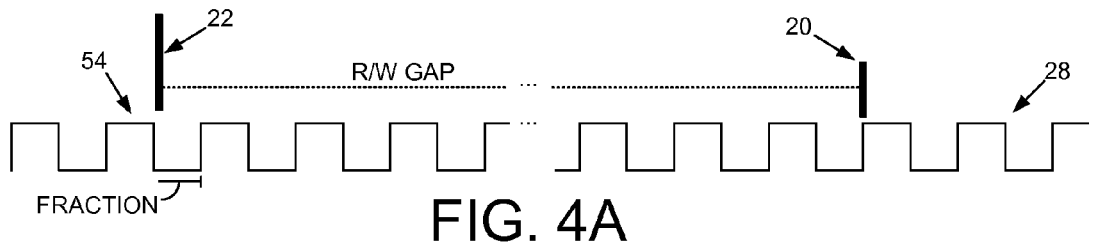
FIGS. 4A and 4B illustrate an embodiment wherein the write delay causes the sync mark to substantially align with an edge of one of the clock cycles.

The above-described technique for measuring the reader/writer gap will provide an accurate measurement when the reader/writer gap spans an integer number of the clock cycles 28 (no fraction). However, when the reader/writer gap comprises a fraction of the clock cycles 28 as illustrated in FIG. 4A, there is an ambiguity in detecting the integer number of clock cycles due to a variance in the timing recovery circuit. That is, even if the fraction of the clock cycle is known, there is an ambiguity in detecting the integer number of clock cycles using the above-described technique. This is illustrated in FIG. 4A wherein when using the above-described technique, the integer number of clock cycles may be rounded either up or down by the last clock cycle 54 (the fractional clock cycle). Accordingly, this rounding error can result in a reader/writer gap measurement that is off by a full clock cycle.

Figure 4B:
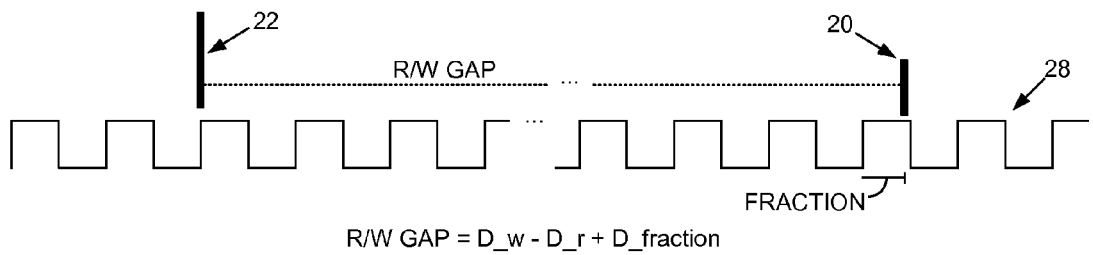

In one embodiment, the above-described rounding error can be avoided by delaying the writing of the second sync mark 52 in FIG. 3A by the fraction of the clock cycle shown in FIG. 4A. This is illustrated in FIG. 4B wherein delaying the writing of the second sync mark 52 by the fraction of the clock cycles causes the write element 22 (and the second sync mark 52) to align with the edge of the next clock cycle. In this manner, the above-described rounding error in measuring the integer number of clock cycles is avoided. Once the integer number of clock cycles has been measured using the technique described above with reference to FIGS. 3A and 3B, the reader/writer gap may be computed by subtracting the read delay (D_r) from the write delay (D_w) and then adding the fractional delay (D_fraction) that was used to write the second sync mark 52.

Figure 5:
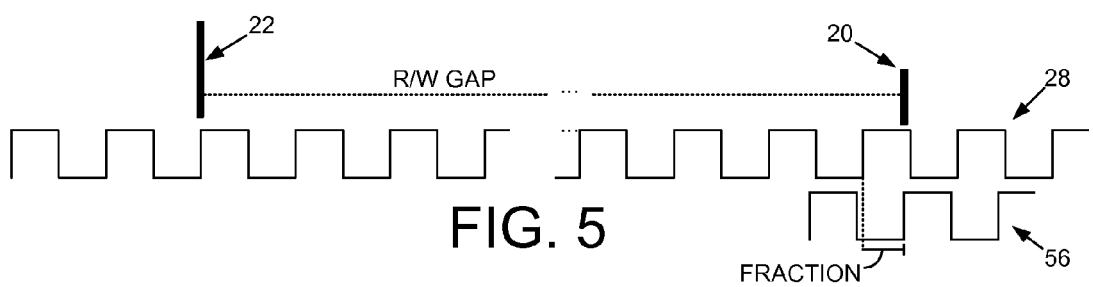
FIG. 5 shows an embodiment for measuring the fraction of the clock cycle by using a first clock synchronized to a servo sector and a second clock synchronized to a preamble written after the servo sector.

Any suitable technique may be employed to measure the fraction of the clock cycle in the reader/writer gap measurement. FIG. 5 illustrates an embodiment wherein the fraction is measured by writing a second preamble at the end of a servo sector similar to writing the second sync mark 52 shown in FIG. 3A. During the second disk revolution, a first disk-locked clock 28 is synchronized to the first preamble of the servo sector, and a second disk-locked clock 56 is synchronized to the second preamble. The phase difference between the first disk-locked clock 28 and the second disk-locked clock 56 represents the fraction of the clock cycle in the reader/writer gap. In another embodiment, the second preamble may be sampled asynchronously with the first disk-locked clock 28 and with the timing recovery disabled. The phase offset between the first preamble and the second preamble may then be measured by computing a discrete Fourier transform (DFT) of the asynchronous signal samples of the second preamble relative to a DFT computed over the synchronous samples of the first preamble (or over synchronous samples of a servo burst).

Figure 6A:
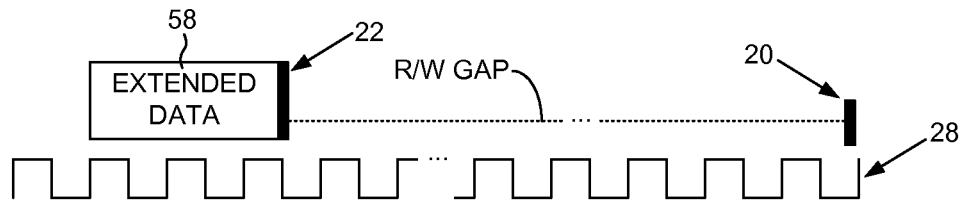
FIG. 6A shows an embodiment wherein the measured reader/writer gap is used to write extended servo data after a servo sector and synchronous with the servo sector.
Figure 6B:
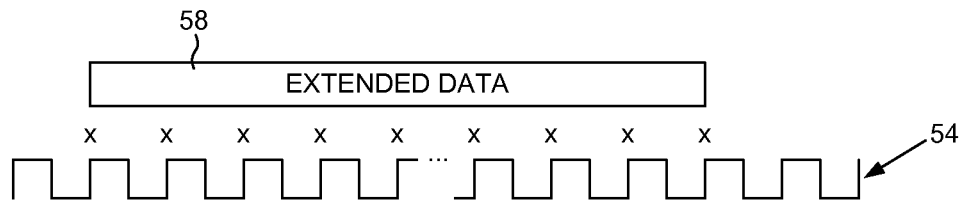
FIG. 6B illustrates how the disk-locked clock may be used to read the extended servo data after the servo sector by synchronously sampling the extended servo data.

FIG. 6A shows an embodiment wherein extended servo data 58 is written to the disk soon after the write element 22 clears the end of the servo sector as determined by the measured reader/writer gap. Delaying by the reader/writer gap (integer plus fraction clock cycles) means the extended data 58 is written substantially synchronous with the disk-locked clock 28. In this manner, when the servo sector is read during normal operation as shown in FIG. 6B, the disk-locked clock 28 is synchronized to the servo sector in order to read the servo data, and then the disk-locked clock 28 is used to read the extended servo data 58 since the disk-locked clock 28 is already synchronized to the extended servo data 58, thereby obviating the need for a preamble and sync mark to read the extended servo data 58. In one embodiment, the disk-locked clock 28 is used to sample the read signal synchronously as illustrated by the "x" in FIG. 6B, wherein the extended servo data 58 is sampled synchronously due to the synchronous write operation described above.

Figure 7:
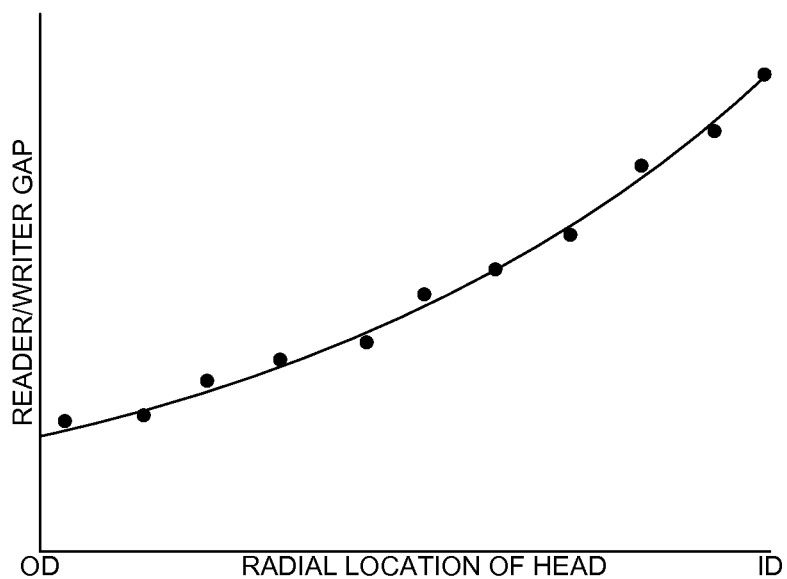
FIG. 7 shows an embodiment where the measured reader/writer gap increases from an outer diameter of the disk toward an inner diameter of the disk due to the change in circumference of the servo tracks.

FIG. 7 illustrates an embodiment wherein the reader/writer gap is measured at a plurality of radial locations across the disk surface, and the data points fitted to a curve represented, for example, by a suitable polynomial function. The reader/writer gap may then be computed at any radial location based on the curve fitted function. In the embodiment shown in FIG. 7, the reader/writer gap increases from the outer diameter of the disk toward the inner diameter of the disk due to the decrease in the circumference of the servo tracks. That is, since the physical distance of the reader/writer gap remains constant, the number of clock cycles spanned by the reader/writer gap will increase toward the inner diameter of the disk due to the decrease in the linear velocity of the servo tracks.

In the embodiment of FIG. 2A, the servo sectors $40_0$-$40_N$ are written at the same data rate from the outer diameter of the disk toward the inner diameter of the disk resulting in a wedge shaped pattern due to the decrease in linear velocity toward the inner diameter of the disk. In another embodiment, a zoned servo format may be used wherein the servo tracks 38 are banded together to form a plurality of zones across the radius of the disk, and the data rate of the servo sectors $40_0$-$40_N$ may be increased from the inner diameter zone toward the outer diameter zone in order to achieve a more constant linear bit density. In this embodiment, the servo sectors $40_0$-$40_N$ form a wedge shaped pattern within each servo zone, and therefore the reader/writer gap measurements across the disk radius will vary in a saw-tooth pattern. In one embodiment, the reader/writer gap measurements are curve fitted to a function for each servo zone.

In the embodiment of FIGS. 3A and 3B for measuring the reader/writer gap, the second sync mark 52 may comprise any suitable pattern. In one embodiment, the second sync mark 52 may comprise the same pattern as the first sync mark 50 following the preamble in a servo sector. In another embodiment, the second sync mark 52 may comprise a different pattern that may be longer or shorter than the first sync mark 50. In general, the second sync mark 52 is essentially any pattern that enables accurate detection, and therefore enables the read delay (D_r) to be accurately determined.

In the embodiment of FIGS. 3A and 3B, the write element 22 follows the read element 20 in that the read element 20 passes over data on the disk followed by the write element 22 (the read element 20 and write element "move" from left to right in the example of FIGS. 3A and 3B). Accordingly in this embodiment, the read element 20 and the write element 22 have cleared the end of the servo sector 40, after the write delay (D_w). In another embodiment, the write element 22 may lead the read element 20 such that the read element 20 may still be over the end of the servo sector 40, when the second sync mark 52 is written. In this embodiment, the reader/writer gap may be measured by subtracting the write delay (D_w) from the read delay (D_r) and adding the fraction.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk;
    a head actuated radially over the disk, wherein the head comprises a read element separated from a write element by a reader/writer gap; and
    control circuitry operable to:
        synchronize a disk-locked clock to a rotation of the disk, wherein:
            the disk-locked clock comprises a plurality of clock cycles; and
            the reader/writer gap spans a first number of the clock cycles comprising a first integer of the clock cycles plus a fraction of one of the clock cycles;
        determine a reference clock cycle of the disk-locked clock;
        delay a write operation relative to the reference clock cycle by a write delay comprising a second number of clock cycles comprising a second integer of the clock cycles plus the fraction of one of the clock cycles;
        write a sync mark on the disk after the write delay; and
        read the sync mark to estimate the first number of clock cycles.

2. The disk drive as recited in claim 1, wherein the second integer of clock cycles is greater than the first integer of clock cycles.

3. The disk drive as recited in claim 1, wherein the write delay causes the sync mark to substantially align with an edge of one of the clock cycles.

4. The disk drive as recited in claim 1, wherein the control circuitry is further operable to:
    measure a read delay based on when the read element reaches the reference clock cycle and when the read element reads the sync mark; and
    estimate the first number of clock cycles based on the write delay, the read delay, and the fraction of one of the clock cycles.

5. The disk drive as recited in claim 4, wherein the control circuitry is further operable to estimate the first number of clock cycles according to:

$$D\_w - D\_r + D\_\text{fraction}$$

where:
D_w represents the second integer of clock cycles;
D_r represents the read delay; and
D_fraction represents the fraction of one of the clock cycles.

6. The disk drive as recited in claim 1, wherein the control circuitry is further operable to measure the fraction of one of the clock cycles.

7. A method of operating a disk drive comprising a head actuated radially over a disk, wherein the head comprises a read element separated from a write element by a reader/writer gap, the method comprising:
    synchronizing a disk-locked clock to a rotation of the disk, wherein:
        the disk-locked clock comprises a plurality of clock cycles; and
        the reader/writer gap spans a first number of the clock cycles comprising a first integer of the clock cycles plus a fraction of one of the clock cycles;
    determining a reference clock cycle of the disk-locked clock;
    delaying a write operation relative to the reference clock cycle by a write delay comprising a second number of clock cycles comprising a second integer of the clock cycles plus the fraction of one of the clock cycles;
    writing a sync mark on the disk after the write delay; and
    reading the sync mark to estimate the first number of clock cycles.

8. The method as recited in claim 7, wherein the second integer of clock cycles is greater than the first integer of clock cycles.

9. The method as recited in claim 7, wherein the write delay causes the sync mark to substantially align with an edge of one of the clock cycles.

10. The method as recited in claim 7, further comprising:
measuring a read delay based on when the read element reaches the reference clock cycle and when the read element reads the sync mark; and
estimating the first number of clock cycles based on the write delay, the read delay, and the fraction of one of the clock cycles.

11. The method as recited in claim 10, further comprising estimating the first number of clock cycles according to:

$$D\_w - D\_r + D\_fraction$$

where:
$D\_w$ represents the second integer of clock cycles;
$D\_r$ represents the read delay; and
$D\_fraction$ represents the fraction of one of the clock cycles.

12. The method as recited in claim 7, further comprising measuring the fraction of one of the clock cycles.

* * * * *